Figures 1, 2, 3:
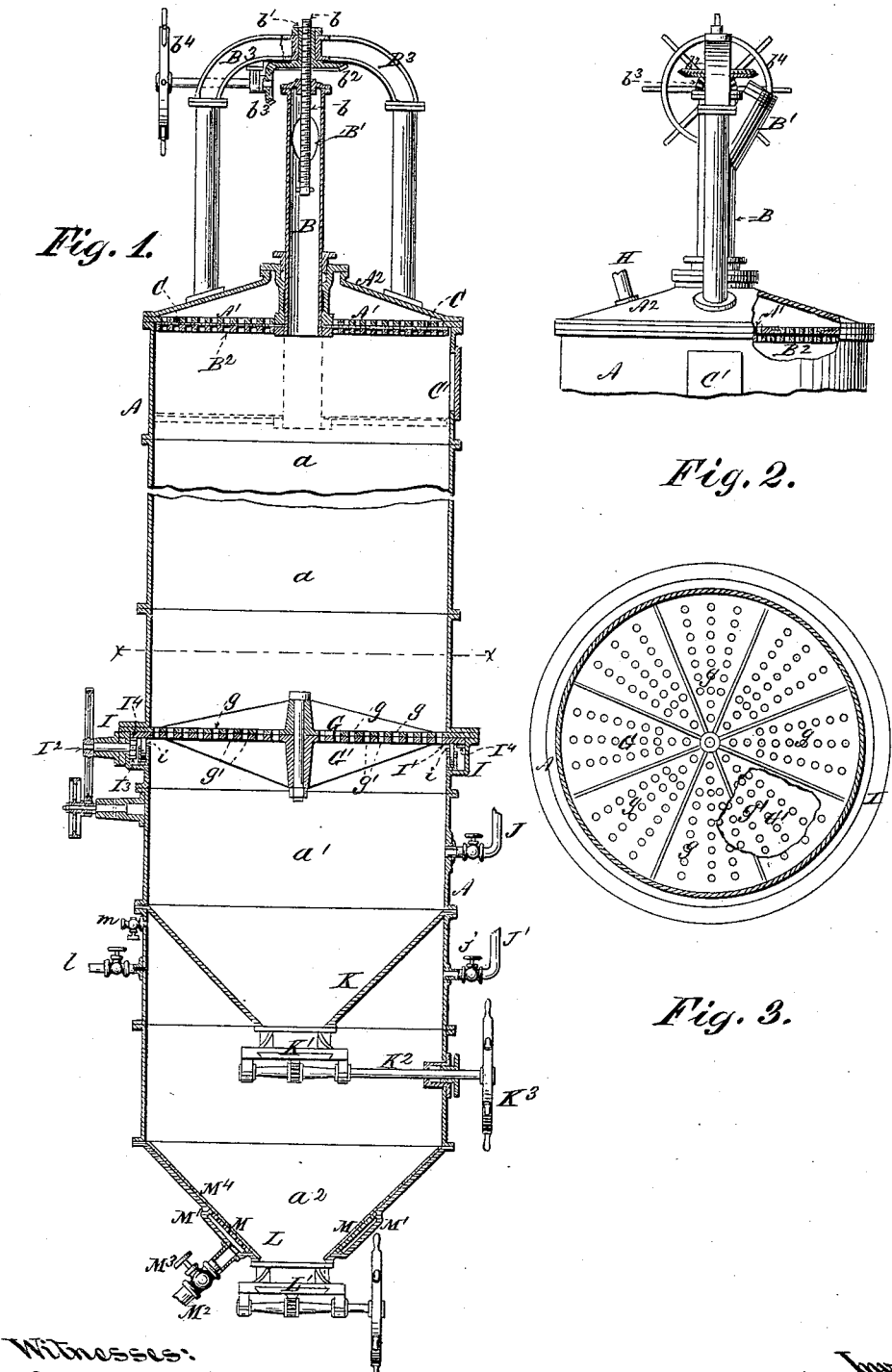

(No Model.) 2 Sheets—Sheet 1.

T. GAUNT.
BONE BLACK FILTER FOR FILTERING SACCHARINE LIQUIDS.

No. 329,306. Patented Oct. 27, 1885.

Witnesses:
R. C. Howes
M. L. Adams

Inventor:
Thomas Gaunt,
Per Edw. E. Quimby,
Atty.

(No Model.) 2 Sheets—Sheet 2.
T. GAUNT.
BONE BLACK FILTER FOR FILTERING SACCHARINE LIQUIDS.
No. 329,306. Patented Oct. 27, 1885.
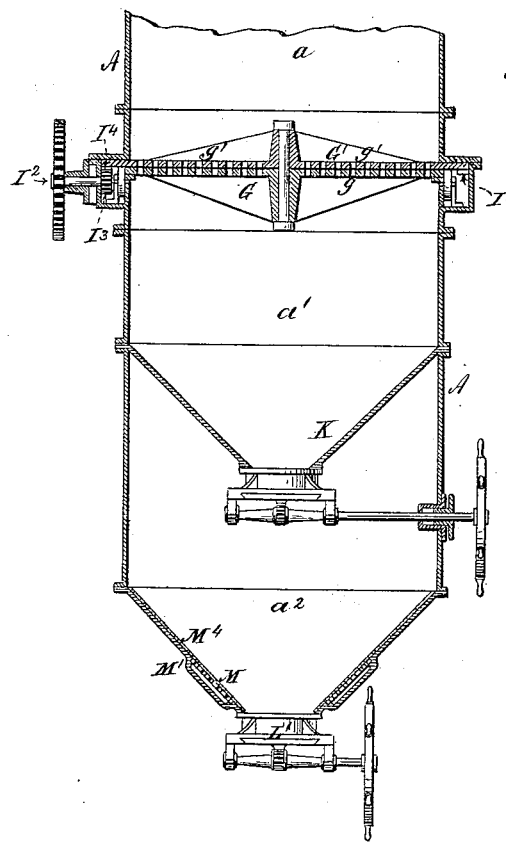
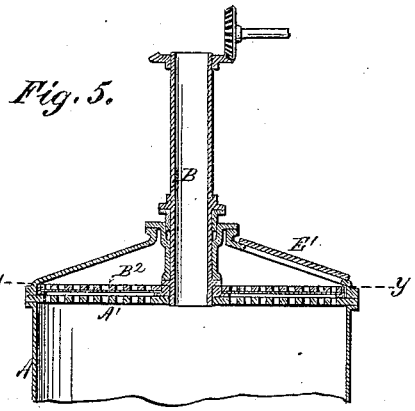
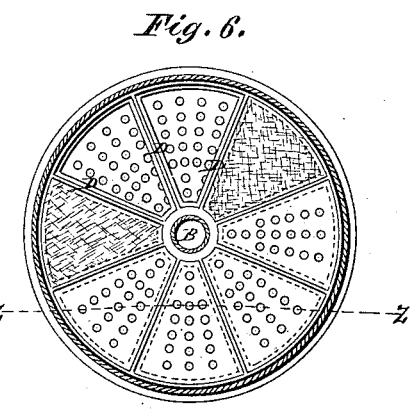

UNITED STATES PATENT OFFICE.

THOMAS GAUNT, OF COLD SPRING, NEW YORK.

BONE-BLACK FILTER FOR FILTERING SACCHARINE LIQUIDS.

SPECIFICATION forming part of Letters Patent No. 329,306, dated October 27, 1885.

Application filed June 19, 1885. Serial No. 169,175. (No model.)

*To all whom it may concern:*

Be it known that I, THOMAS GAUNT, of Cold Spring, New York, have invented certain Improvements in Bone-Black Filters for Filtering Saccharine and other Liquors, of which the following is a specification.

My improvements relate to the class of filters for decolorizing sugar-liquor by the process of upward filtration through bone-black. In this class of filters the sugar-liquor is introduced at the bottom and forced upward through the mass of bone-black contained in the filtering-chamber, and is discharged from the top thereof. As the bone-black which soonest becomes exhausted is that at the bottom of the mass, provision must be made for gradually discharging the exhausted bone-black from the bottom of the filtering-chamber and feeding fresh bone-black into the top of the filtering-chamber, so that the escaping liquor always comes in contact with fresh bone-black.

My invention consists in the provision at the lower part of the filtering-chamber of a perforated fixed diaphragm for supporting the mass of filtering material, and the combination, with the said diaphragm, of a rotating valve provided with apertures which are successively brought into and out of alignment with the different apertures in the fixed diaphragm. Beneath the said valve I provide a receiving-chamber for receiving the exhausted bone-black. This chamber is in the form of an inverted frustum of a cone, and is provided at its lower open end with a valve, by the operation of which the lower end of the receiving-chamber may be opened or closed. Beneath the receiving-chamber I provide a supplementary chamber, also having a valve at the bottom. Beneath this supplementary chamber there may also be provided another supplementary chamber, if desired.

Another feature of my improvement consists in providing the upper end of the filtering-chamber with a blanket screen supported by a perforated annular metallic plate or plates. When two plates are used, one is made stationary, and the other plate affixed to the lower end of a movable tube, through which the bone-black is fed into the upper part of the filtering-chamber.

The accompanying drawings of a bone-black filter for filtering sugar-liquor containing my improvements are as follows:

Figure 1 is a central vertical section. Fig. 2 is an elevation, partly in section, of the upper portion of the filtering-cylinder. Fig. 3 is a horizontal section through the line $xx$ on Fig. 1, with a portion of the stationary diaphragm at the bottom of the filtering-chamber broken away for the purpose of exhibiting the apertures in the movable diaphragm beneath it. Fig. 4 is a central vertical section of the lower part of the apparatus, showing the modification in which the stationary perforated diaphragm at the bottom of the filtering-chamber is arranged beneath the rotating perforated diaphragm, instead of above it, as in Fig. 1. Fig. 5 is a vertical section of the upper part of the apparatus, showing the modification in which the feed-tube for introducing bone-black into the top of the filtering-chamber, instead of being vertically movable, is arranged to be rotated for the purpose of bringing all the sectors of the perforated screen in succession under the man-hole arranged in the top of the filtering-chamber. Fig. 6 is a horizontal section through the line $yy$ on Fig. 5, affording a top view of the rotating screen. Fig. 7 is a vertical section of the rotating screen, taken through the line $zz$ on Fig. 6.

The structure represented in the drawings consists of a vertical metallic cylinder, A, the upper portion of which constitutes the filtering-chamber $a$. At its upper end the cylinder A is provided with a fixed horizontal centrally-perforated plate, A', above which is the truncated conical top $A^2$. The perforated plate A' and the conical top $A^2$ of the cylinder A are provided with central openings for the admission of the vertically-adjustable feed-tube B, the upper portion of which is provided with an outwardly and upwardly inclined branch, B', through which the bone-black is introduced into the tube B, for delivery into the top of the filtering-chamber $a$. At its lower end the tube B has affixed to it the horizontal perforated annular plate $B^2$. A blanket, C, rests upon the top of the perforated plate $B^2$, and when the tube B is elevated into the position in which it is shown in Fig. 1 is confined between the vertically-movable perforated plate $B^2$ and the stationary perforated plate A'. The movable perforated plate B² may be arranged, as shown in Fig. 1, under the stationary perforated plate A', or it may be arranged above the stationary plate, as shown in Fig. 5. When the plate A' is arranged as shown in Fig. 1, a manhole, C', is provided in the side wall of the cylinder A, to allow access to the interior of the cylinder and to the blanket C when the plate B² is lowered.

The construction of the screen may be modified, as illustrated in detail in Figs. 5, 6, and 7, in which, as will be seen, the feed-tube B, instead of being made vertically adjustable, is adapted to be rotated upon its vertical axis, and has the screen affixed to its lower end. In this case the frame which supports the blanket is in the form of a wheel, and is provided with spokes D D, &c. Each of these spokes in cross-section is in the form of an inverted T, and the spaces between the spokes are filled with the sector-shaped screens E E, &c. A man-hole, E', is provided in the top of the cylinder A, to which access can be had for the removal or adjustment of the sector-shaped screens E.

The object in providing for the rotation of the tube B is to bring the sector-shaped screens successively under the man-hole E', in convenient position to be reached through the man-hole. Another advantage in this mode of construction consists in the fact that, especially in the case of a filter of large diameter, it will be more convenient to make the blanket in sector-shaped pieces, so that in case of irregular wear the worn sector can be taken away and replaced with a new blanket-sector without disturbing the other blanket-sectors.

In either of the forms of constructing the perforated plates or frame for supporting the blanket it will be advisable to make the blanket in sector-shaped pieces, for convenience of removal and renewal. The vertical adjustment of the tube B is effected by means of the fixed vertical screw-bolt $b$, the upper portion of which engages the elevating-nut $b'$, which is provided with a suitable bearing in the inverted-U-shaped frame B³, and is rotated by means of the bevel-toothed wheels $b^2$ $b^3$, by power applied to the actuating-wheel $b^4$. The filtered sugar-liquor which makes its way upward into the space above the fixed perforated plate A' is discharged therefrom through the discharge-pipe H. The bone-black contained in the filtering-chamber $a$ is supported at the bottom upon the fixed diaphragm or supporting-plate G, containing a multiplicity of apertures, $g$ $g$ $g$, &c. Immediately beneath the fixed diaphragm G is the movable valve-plate G', containing apertures $g'$ $g'$ $g'$, &c., corresponding to the apertures $g$ $g$ $g$ in the fixed plate G. Provision is made for vibrating or rotating the valve-plate G', and thereby causing the apertures in it to be alternately brought into and removed from alignment with the apertures in the fixed plate G. To effect the rotation of the valve-plate G', the cylinder A is provided with a circumferential enlargement, I, and the rim I' of the valve is supported upon anti-friction rollers $i$. The necessary rotating motion is imparted to the valve by means of the horizontal shaft I², provided upon its inner end with the spur-wheel I³, which engages the teeth I⁴ upon the under side of the rim adjoining its periphery. When by the rotation of the valve-plate G' the apertures in it are brought into alignment with the apertures in the fixed diaphragm G, the exhausted bone-black is permitted to fall by its own gravity from the bottom of the mass of bone-black contained in the filtering-chamber $a$. The sugar-liquor to be filtered is supplied from a suitably-elevated reservoir, or under suitable pressure, through the supply-pipe J, the mouth of which is inserted in the wall of the receiving-chamber $a'$, a short distance below the bone-black-discharging valve. As the exhausted bone-black is discharged, it falls into the receiving-chamber $a'$, the lower portions of the walls of which form an inverted frustum of a cone, K. The central opening in the bottom of the receiving-chamber $a'$ is provided with the tight-fitting sliding valve K', which is operated by means of the horizontal shaft K², provided with a suitably-packed bearing in the walls of the cylinder A, and provided on its outer end with the actuating hand-wheel K³. When the valve K' is opened, the exhausted bone-black falls through the receiving-chamber $a'$ into the supplemental chamber $a^2$. The lower portions of the walls of the supplemental chamber also form an inverted frustum of a cone, L, the central opening at the bottom of which is closed by the tight-fitting valve L'. A pipe, J', for supplying sugar-liquor, is inserted in the upper part of the side wall of the supplemental chamber, and another pipe, $l$, is also inserted therein for the introduction of water with which to wash the bone-black contained in the supplemental chamber. The lower portion of the flaring wall of the supplemental chamber is provided with the perforations M M M, &c., through which the liquid contained in the supplemental chamber is discharged into the jacket M', from which it is drained through the pipe M², provided with the cock M³. The upper part of the supplemental chamber is also provided with an air-cock, $m$, which is opened for the escape of air when the supplemental chamber is being filled with sugar-liquor. The inner surface of the perforated wall of the supplemental chamber is covered with a blanket, M⁴, in order to prevent the bone-black from making its way through the perforations M into the jacket M'.

In operation the filtering-chamber $a$ is filled with bone-black, and as the exhausted bone-black is gradually discharged from the bottom by the operation of the discharge-valve the mass of bone-black contained in the chamber $a$ gradually settles, and in proportion as it settles fresh bone-black is supplied to the upper part of the filtering-chamber from the column of bone-black contained in the vertical feed-tube B. The sugar-liquor is introduced under pressure into the receiving-chamber $a'$, and, the valve K' being open, fills the supplemental chamber and the receiving-chamber, and then forces its way upward through the mass of bone-black contained in the filtering-chamber. As the operation goes on, the exhausted bone-black discharged by the operation of the discharging-valve falls into the receiving-chamber, and thence through the opening in the bottom thereof into the supplemental chamber, displacing a portion of the sugar-liquor therein and causing it to rise into the upper part of the apparatus. When the exhausted bone-black has filled the supplemental chamber nearly up to the level of the valve K', the valve K' is closed and the excess of sugar-liquor contained in the supplemental chamber is then drawn or pumped off by opening the cock $M^3$. Water may then be introduced into the supplemental chamber through the pipe $l$, for washing the bone-black contained therein; or the valve L' may at once be opened and the bone-black removed from the supplemental chamber for washing in a separate vessel or in a second supplemental chamber. The sugar-liquor drawn off from the supplemental chamber is pumped back into the elevated sugar-liquor reservoir, and after the bone-black is removed from the supplemental chamber the valve L' is closed, and the supplemental chamber is again filled with sugar-liquor by opening the cock $j$ in the pipe J', the air-cock $m'$ being opened in order to permit the escape of air from the supplemental chamber, so that its place may be taken by the sugar-liquor. When the supplemental chamber has been again filled with sugar-liquor, the valve K' is opened, and the exhausted bone-black, which in the meantime has been collecting in the receiving-chamber, is dropped into the supplemental chamber, and the operation is thus carried on continuously.

The object in filling the supplemental chamber with sugar-liquor after the charge of exhausted bone-black has been removed from it, and before the valve K' is opened, is to prevent the partial draining of the sugar-liquor from the filtering-chamber $a$, which would ensue if the supplemental chamber were not filled with sugar-liquor. By this mode of operation the upward current of sugar-liquor through the bone-black contained in the filtering-chamber is not interfered with, and the filtering operation is kept up without interruption.

I claim as my invention—

1. In apparatus for decolorizing saccharine or other liquors by the process of upward filtration through bone-black, a filtering-chamber provided at the bottom with a fixed suitably-apertured diaphragm and a movable bone-black-discharging valve, and means of operating said valve, and thereby successively moving an aperture or apertures in said valve into or out of alignment with the apertures in the said diaphragm, and means for introducing fresh bone-black into the top of said filtering-chamber, in combination with a receiving-chamber beneath the bone-black-discharging valve, a valve for closing the bottom of the receiving-chamber, and means for operating the said valve, and a supplemental chamber beneath the said receiving-chamber, provided with a drain-cock, and a valve at the bottom for discharging its contents, substantially as set forth.

2. In combination with the filtering-chamber $a$ in the upper part of the vertical cylinder A, and provided at the bottom with a movable bone-black-discharging valve, a receiving-chamber, $a'$, having its lower portion in the form of an inverted frustum of a cone, and provided at its lower end with the valve K', and means for operating the said valve, and a supplemental chamber beneath the said receiving-chamber, provided with a drain-cock, and a valve for discharging its contents, substantially as described.

3. The supplemental chamber $a^2$, provided with the air-cock $m$, and provided with the sugar-liquor-supply pipe J', in combination with the receiving-chamber $a'$, provided with the valve K', and the filtering-chamber $a$, and means for effecting the gradual discharge of the lowest stratum of bone-black from the filtering-chamber into the receiving-chamber, and a suitably-screened outlet at the top of the filtering-chamber for the discharge of the filtered sugar-liquor, substantially as set forth.

4. The filtering-chamber $a$, for containing the bone-black, and means for gradually discharging the bone-black from the bottom of the said chamber, in combination with the feed-tube B, and a suitably-perforated screen occupying the annular space between the said feed-tube B and the shell of the cylinder A, as and for the purpose set forth.

5. A screen for a filtering-cylinder, composed of suitably-perforated plates and sector-shaped pieces of blanket.

THOMAS GAUNT.

Witnesses:
R. C. HOWES,
M. L. ADAMS.